United States Patent
Keohane et al.

(10) Patent No.: US 7,093,120 B2
(45) Date of Patent: Aug. 15, 2006

(54) METHOD, APPARATUS, AND PROGRAM FOR PERFORMING BOOT, MAINTENANCE, OR INSTALL OPERATIONS ON A STORAGE AREA NETWORK

(75) Inventors: Susann Keohane, Austin, TX (US); Gerald F. McBrearty, Austin, TX (US); Shawn P. Mullen, Buda, TX (US); Jessica Kelley Murillo, Hutto, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 10/448,238

(22) Filed: May 29, 2003

(65) Prior Publication Data

US 2004/0243796 A1 Dec. 2, 2004

(51) Int. Cl.
*G06F 9/445* (2006.01)
(52) U.S. Cl. .......................................... 713/2; 709/222
(58) Field of Classification Search .................... 713/2; 709/222
See application file for complete search history.

(56) References Cited

U.S. PATENT DOCUMENTS

| | | | |
|---|---|---|---|
| 6,343,324 B1 | 1/2002 | Hubis et al. ................ 709/229 |
| 6,345,294 B1 | 2/2002 | O'Toole et al. .............. 709/222 |
| 6,684,326 B1* | 1/2004 | Cromer et al. .................. 713/2 |
| 6,754,818 B1* | 6/2004 | Lee et al. ......................... 713/2 |
| 2002/0156984 A1 | 10/2002 | Padovano .................... 711/148 |
| 2003/0014621 A1* | 1/2003 | French et al. ................... 713/2 |
| 2003/0046529 A1* | 3/2003 | Loison et al. ................... 713/2 |
| 2003/0097553 A1* | 5/2003 | Frye ............................... 713/2 |

FOREIGN PATENT DOCUMENTS

WO   WO 02/071224   9/2002

* cited by examiner

*Primary Examiner*—Thomas Lee
*Assistant Examiner*—Hari Patel
(74) *Attorney, Agent, or Firm*—Duke W. Yee; Marilyn Smith Dawkins; Wayne P. Bailey

(57) ABSTRACT

A mechanism is provided for configuring a set of devices for a given machine attached to a storage area network. The initial program load firmware and network adapter firmware for each machine on the storage area network are modified to query a storage area network appliance for lists of devices. The storage area network appliance may be identified by a world wide name and may store lists of boot devices, root volume group devices, primary devices, and secondary devices for each machine on the storage area network. The storage area network appliance then listens for queries and returns the appropriate list of devices based on query type and/or boot type. The boot type for a machine may be set to normal boot, maintenance boot, or install boot.

20 Claims, 5 Drawing Sheets

METHOD, APPARATUS, AND PROGRAM FOR PERFORMING BOOT, MAINTENANCE, OR INSTALL OPERATIONS ON A STORAGE AREA NETWORK

BACKGROUND OF THE INVENTION

1. Technical Field

The present invention relates to storage area networks. Still more particularly, the present invention provides a method, apparatus, and program for performing boot, maintenance, or install operations on a storage area network.

2. Description of Related Art

A storage area network (SAN) is a network of storage disks. In large enterprises, a SAN connects multiple servers to a centralized pool of disk storage. Compared to managing hundreds of servers, each with their own disks, a SAN improves system administration. By treating all the storage as a single resource, disk maintenance and routine backups are easier to schedule and control. In some SANs, the disks themselves can copy data to other disks for backup without any processing overhead at the host computers.

The SAN network allows data transfers between computers and disks at the same high peripheral channel speeds as when they are directly attached. Fibre Channel is a driving force with SANs and is typically used to encapsulate SCSI commands. Serial strage architecture (SSA) and enterprise system connection (ESCON) channels are also supported. A SAN option that is expected to become popular is IP storage, which enables data transfer via IP over fast Gigabit Ethernet locally or via the Internet to anywhere in the world. IP storage is also referred to as "iSCSI."

A SAN may include a large number of storage devices. This makes boot, maintenance, and installation operations difficult. For example, a workstation or server may boot from a boot device that is within 40,000 disks on the SAN. Configuring a large number of devices in order to configure a boot device is time consuming and inefficient.

Currently, a boot device is identified in a non-volatile random access memory (NVRAM). Therefore, if a maintenance operation or installation requires the computer to boot from an alternative device, the identified device must be changed in NVRAM. For example, if an install operation is to be performed on a computer, an administrator may need to boot the computer from a removable medium, such as a compact disk (CD). Therefore, the administrator must change the boot disk in the computer to refer to a CD drive on the SAN.

Therefore, it would be advantageous to provide an improved mechanism for performing boot, maintenance, or install operations on a storage area network.

SUMMARY OF THE INVENTION

The present invention provides a mechanism for configuring a set of devices for a given machine attached to a storage area network. The initial program load firmware and network adapter firmware for each machine on the storage area network are modified to query a storage area network appliance for lists of devices. The storage area network appliance may be identified by a world wide name and may store lists of boot devices, root volume group devices, primary devices, and secondary devices for each machine on the storage area network. The storage area network appliance then listens for queries and returns the appropriate list of devices based on query type and/or boot type. The boot type for a machine may be set to normal boot, maintenance boot, or install boot.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
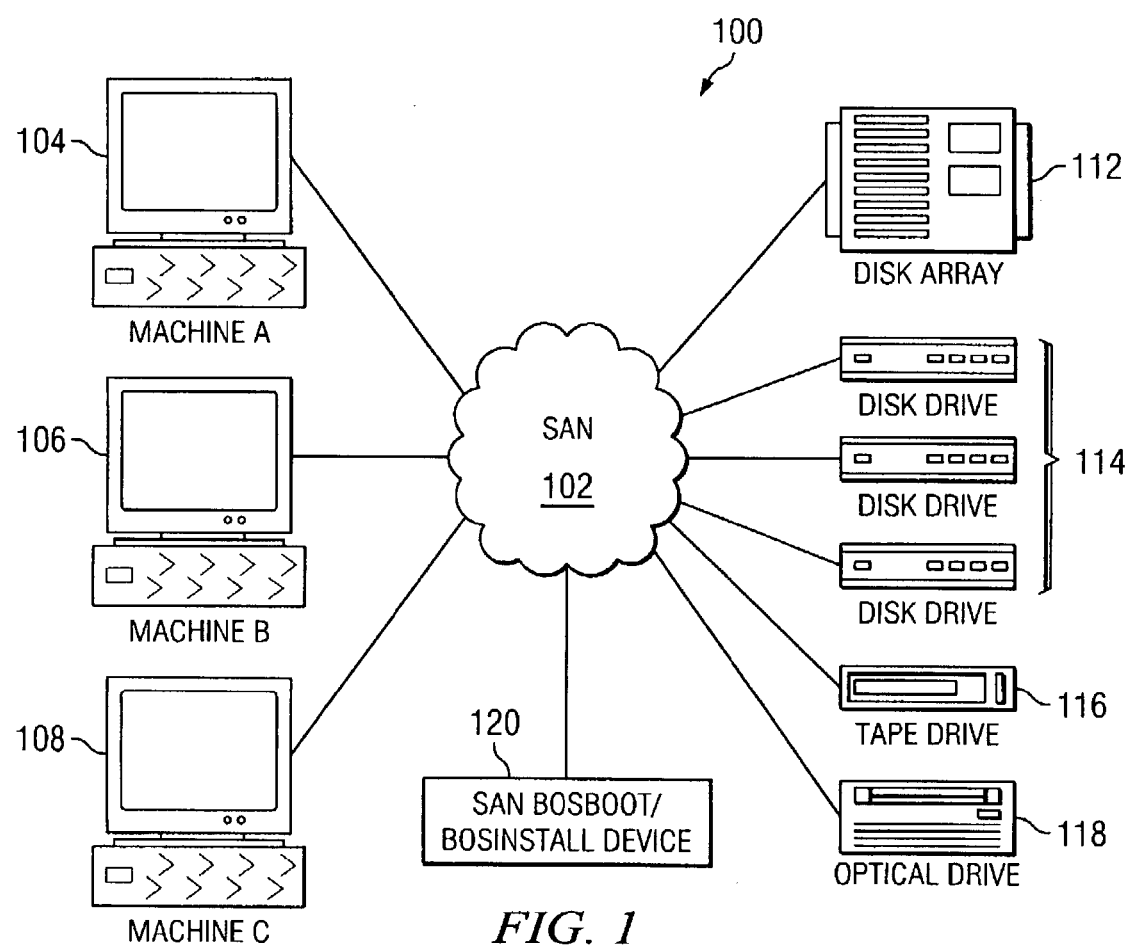
FIG. 1 depicts a pictorial representation of a storage area network data processing system in which the present invention may be implemented.

With reference now to the figures, FIG. 1 depicts a pictorial representation of a storage area network (SAN) data processing system in which the present invention may be implemented. SAN data processing system 100 is a network of computers in which the present invention may be implemented. Network data processing system 100 contains a storage area network 102, which is the medium used to provide communications links between various devices and computers connected together within network data processing system 100. Network 102 may include connections, such as wire, wireless communication links, or fiber optic cables.

In the depicted example, machine A 104, machine B 106, and machine C 108 are connected to SAN fabric 102 along with a plurality storage devices. The plurality of devices may include disk array 112, disk drives 114, tape drive 116, and optical drive 118. SAN data processing system 100 may include additional machines and other storage devices not shown. In some examples, the plurality of storage devices may include tens of thousands of disks. Machine A, machine B, and machine C may be servers and/or client workstations.

In the depicted example, SAN fabric 102 may be a fibre channel network. Fibre channel is a high-speed transport technology used to build storage area networks (SANs). Although fibre channel can be used as a general-purpose network carrying ATM, IP and other protocols, it has been primarily used for transporting SCSI traffic from servers to disk arrays. The Fibre Channel Protocol (FCP) serializes SCSI commands into Fibre Channel frames. IP, however, is used for in-band SNMP network management. Fibre channel not only supports singlemode and multimode fiber connections, but coaxial cable and twisted pair as well. Of course, SAN data processing system 100 also may be implemented as a number of different types of networks, such as for example, an intranet, a local area network (LAN), or a wide area network (WAN). FIG. 1 is intended as an example, and not as an architectural limitation for the present invention.

Machine 104–108 may boot from devices in the SAN. For example Machine A 104 may boot from a disk within disk drives 114. Currently, the boot device address must be stored in NVRAM within machine A. Therefore, if a maintenance operation or installation requires the computer to boot from an alternative device, the identified device must be changed in NVRAM. For example, if an install operation is to be performed on a computer, an administrator may need to boot the computer from a removable medium, such as a compact disk (CD). Therefore, the administrator must change the boot disk in the computer to refer to a CD drive on the SAN.

In accordance with a preferred embodiment of the present invention, SAN BOSBoot/BOSInstall device 120 is connected to SAN fabric 102. The initial program load (IPL) firmware and network adapter firmware of machines 104–108 are modified to query SAN device 120 for lists of devices. The network adapter has stored there in the address or world wide name (WWN) of the SAN device. When performing a basic operating system (BOS) boot operation or install operation, the firmware sends a query for boot devices to the SAN device. Thereafter, the firmware may send similar queries for root volume group (rootvg) devices, primary devices, secondary devices, and non-essential devices.

An administrator may set the boot type for a machine to normal boot, install, or maintenance boot. This boot type may be stored in SAN device 120. An administrator also stores lists of boot devices, rootvg devices, primary devices, secondary devices, and non-essential devices in the SAN device. The SAN BOSboot/BOSinstall device listens for queries from machines on the SAN. When a boot query is received, SAN device 120 returns an appropriate list of boot devices based on the boot type. Similarly, the SAN device may also return lists of rootvg devices, primary devices, secondary devices, or non-essential devices based on the query received from machines on the SAN.

Figure 2:
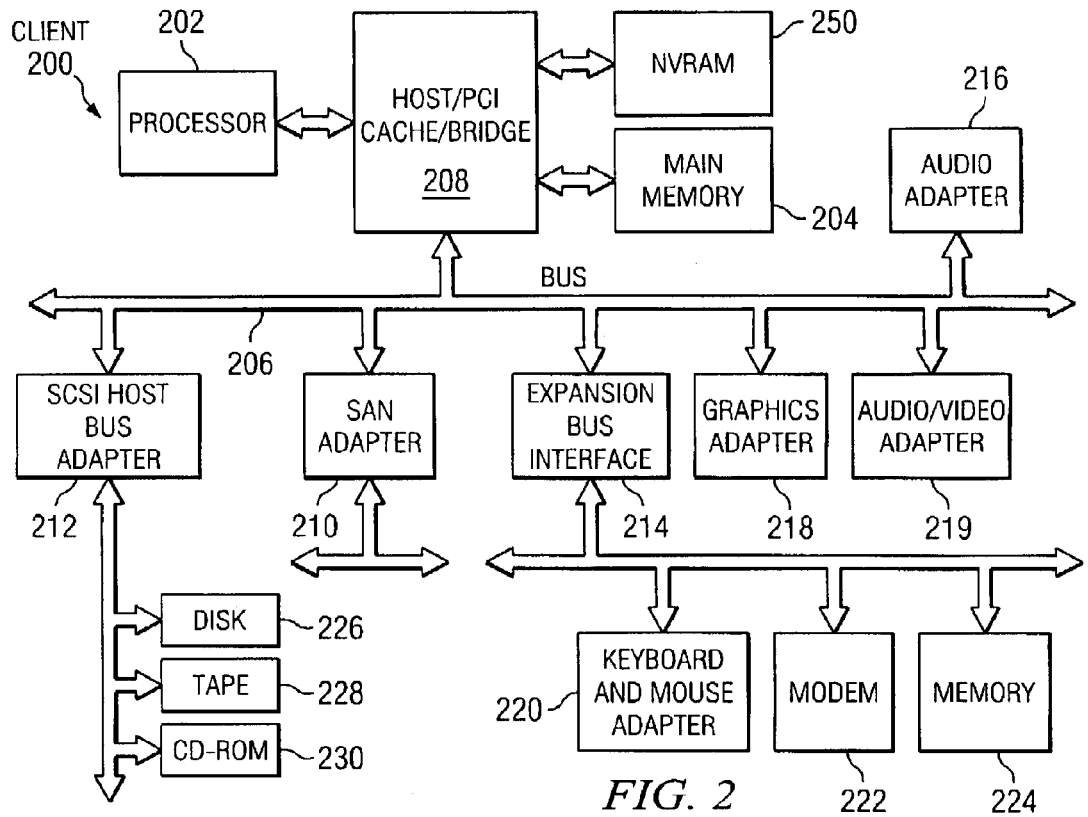
FIG. 2 is a block diagram illustrating a data processing system in which the present invention may be implemented.

With reference now to FIG. 2, a block diagram illustrating a data processing system is depicted in which the present invention may be implemented. Data processing system 200 is an example of a client computer. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, storage area network (SAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Small computer system interface (SCSI) host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as Windows XP, which is available from Microsoft Corporation. An object oriented programming system such as Java may run in conjunction with the operating system and provide calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

In a preferred embodiment of the present invention, data processing system 200 boots from a device on a storage area network, via SAN adapter 210. Processor 202 loads boot code, also referred to as initial program load (IPL) firmware, from NVRAM 250. The boot code includes instructions for querying a SAN BOSboot/BOSinstall device for devices. Firmware in SAN adapter 210 may include the world wide name (WWN) for the SAN device. Alternatively, the WWN for the SAN device may be stored set in the boot code.

When performing a BOSboot operation or BOSinstall operation, the firmware sends a query for boot devices to the SAN device. Thereafter, the firmware may send similar queries for root volume group (rootvg) devices, primary devices, secondary devices, and non-essential devices. Thus, the present invention provides a dynamic mechanism for determining a set of devices to be configured for a given machine.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

Figure 3:
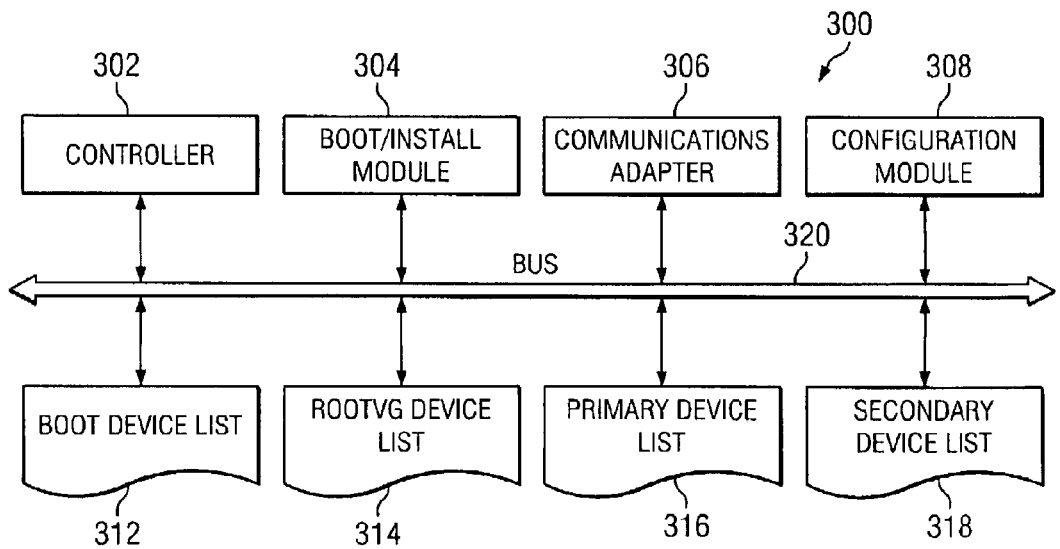
FIG. 3 is an exemplary block diagram of a SAN BOSboot/BOSinstall device in accordance with a preferred embodiment of the present invention.

FIG. 3 is an exemplary block diagram of a SAN BOSboot/BOSinstall device in accordance with a preferred embodiment of the present invention. SAN appliance 300 includes controller 302, boot/install module 304, communications adapter 306, and configuration module 308. The elements 302–308 may be implemented as hardware, software, or a combination of hardware and software. In a preferred embodiment, boot/install module 304 and configuration module 308 are implemented as software instructions executed by one or more processors. Preferably, communications adapter 306 is a SAN adapter, such as a fibre channel adapter, for communicating with machines and devices on a storage area network.

SAN appliance 300 also stores boot device list 312, rootvg device list 314, primary device list 316, and secondary device list 318. In this example, the SAN device stores boot device lists, root volume group device lists, primary device lists, and secondary device lists; however, more or fewer device lists may be stored within the scope of the present invention. For example SAN appliance 300 may also store a non-essential device list. SAN appliance 300 may also store separate lists for normal boot devices, install boot devices, and maintenance boot devices.

The elements 302–308 and 312–318 are coupled to one another via the control/data signal bus 320. Although a bus architecture is shown in FIG. 3, the present invention is not limited to such. Rather, any architecture that facilitates the communication of control/data signals between elements 302–308 and 312–318 may be used without departing from the spirit and scope of the present invention. Controller 302 controls the overall operation of the SAN appliance and orchestrates the operation of the other elements 304–308.

With the operation of the present invention, boot/install module 304 instructs controller 302 to listen for queries through communications adapter 306. SAN appliance 300 may also store a boot type for each machine. This may be stored in boot device list 312 or elsewhere. When a query for boot devices is received, boot/install module identifies the appropriate boot devices in boot device list 312 based on the boot type for the requesting machine. When a query for rootvg devices is received, the boot/install module returns a list of rootvg devices from rootvg device list 314. When a query for primary devices is received, boot/install module 304 returns a list of primary devices from primary device list 316. Similarly, when a query for secondary devices is received, the boot/install module returns a list of secondary devices from secondary device list 318.

Configuration module 308 instructs controller 302 to communicate with a machine to configure settings and to generate, update, delete, and modify device lists. For example, configuration module 308 may allow an administrator at a remote location to set a boot type for a specific machine or to add a device to the primary device list. In a preferred embodiment of present invention, configuration module 308 may include a Web server to provide a configuration interface through a Web browser at an administrator workstation.

The depicted example in FIG. 3 and above-described examples are not meant to imply architectural limitations. For example, SAN appliance 300 also may be a computer or server connected to the storage area network. The configuration module may also allow an administrator to set other options, such as the WWN or address of the SAN appliance, a username and password for the SAN appliance, etc.

Figure 4:
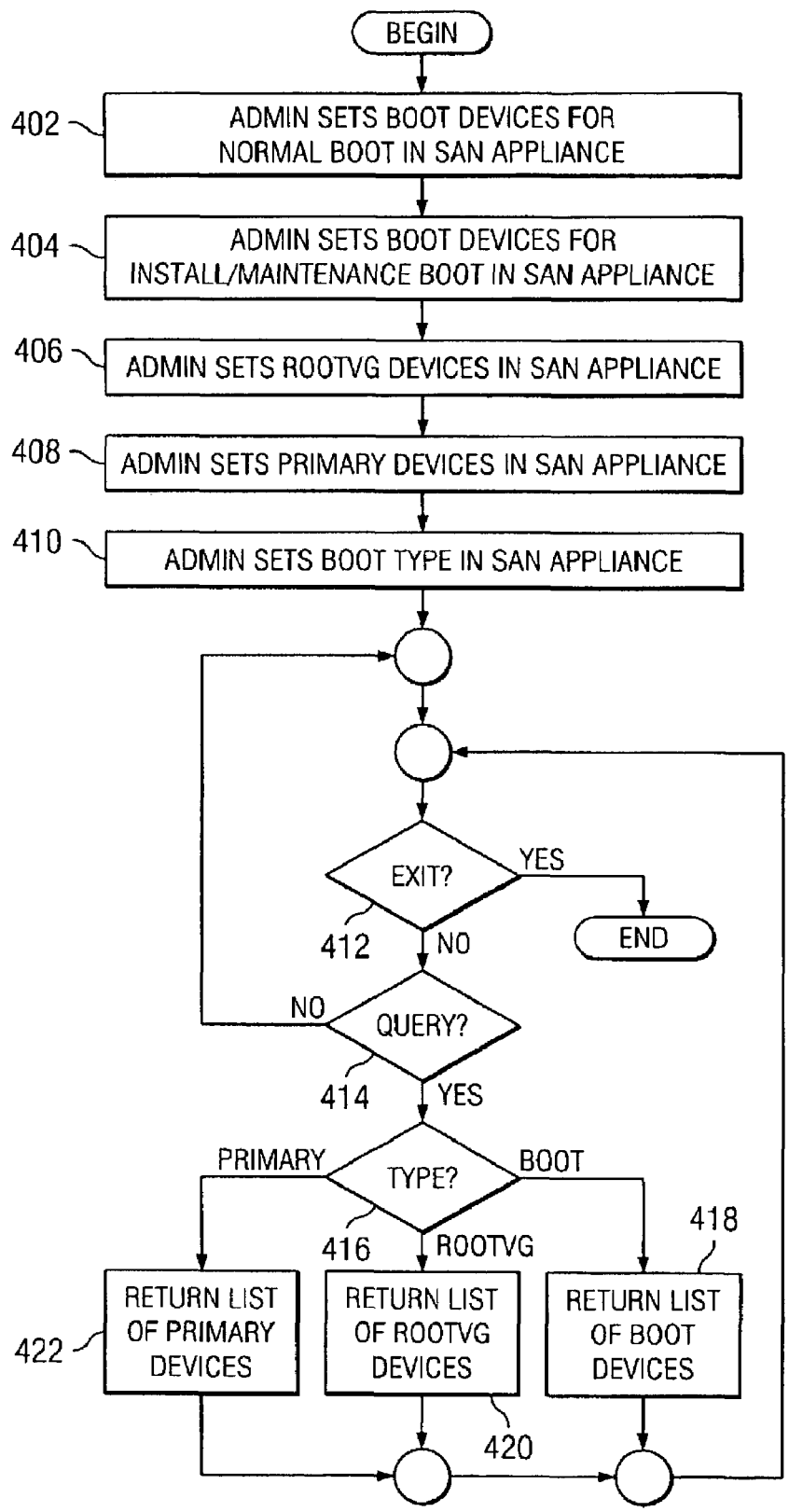
FIG. 4 is a flowchart illustrating the operation of a SAN BOSboot/BOSinstall device in accordance with a preferred embodiment of the present invention.

With reference to FIG. 4, a flowchart illustrating the operation of a SAN BoSboot/BOSinstall device is shown in accordance with a preferred embodiment of the present invention. The process begins and an administrator sets boot devices for normal boot in the SAN device (step 402) and the administrator sets boot devices for install/maintenance boot in the SAN device (step 404). Then, the administrator sets rootvg devices (step 406), sets primary devices (step 408), and sets boot types for machines (step 410) in the SAN appliance.

A determination is made as to whether an exit condition exists (step 412). An exit condition may exist, for example, when the SAN device is turned off or taken off-line. If an exit condition exists, then the process ends. If, however, an exit condition does not exist in step 412, a determination is made as to whether a query is received (step 414). If a query is not received, the process returns to step 412 to determine whether an exit condition exists.

If a query is received in step 414, the query type is determined (step 416). If the query is a boot query, the process returns a list of boot devices based on a boot type of the requesting machine (step 418). Thereafter, the process returns to step 412 to determine whether an exit condition exists. If the query is a rootvg query in step 416, the process returns a list of rootvg devices to the requesting machine (step 420) and returns to step 412 to determine whether an exit condition exists. If the query is a primary device query in step 416, the process returns a list of primary devices to the requesting machine (step 422) and returns to step 412 to determine whether an exit condition exists.

The example shown in FIG. 4 returns boot device lists, root volume group device lists, and primary device lists. However, the SAN device may return more or fewer device lists within the scope of the present invention. For example, query types may also include queries for secondary devices and non-essential devices.

Figure 5:
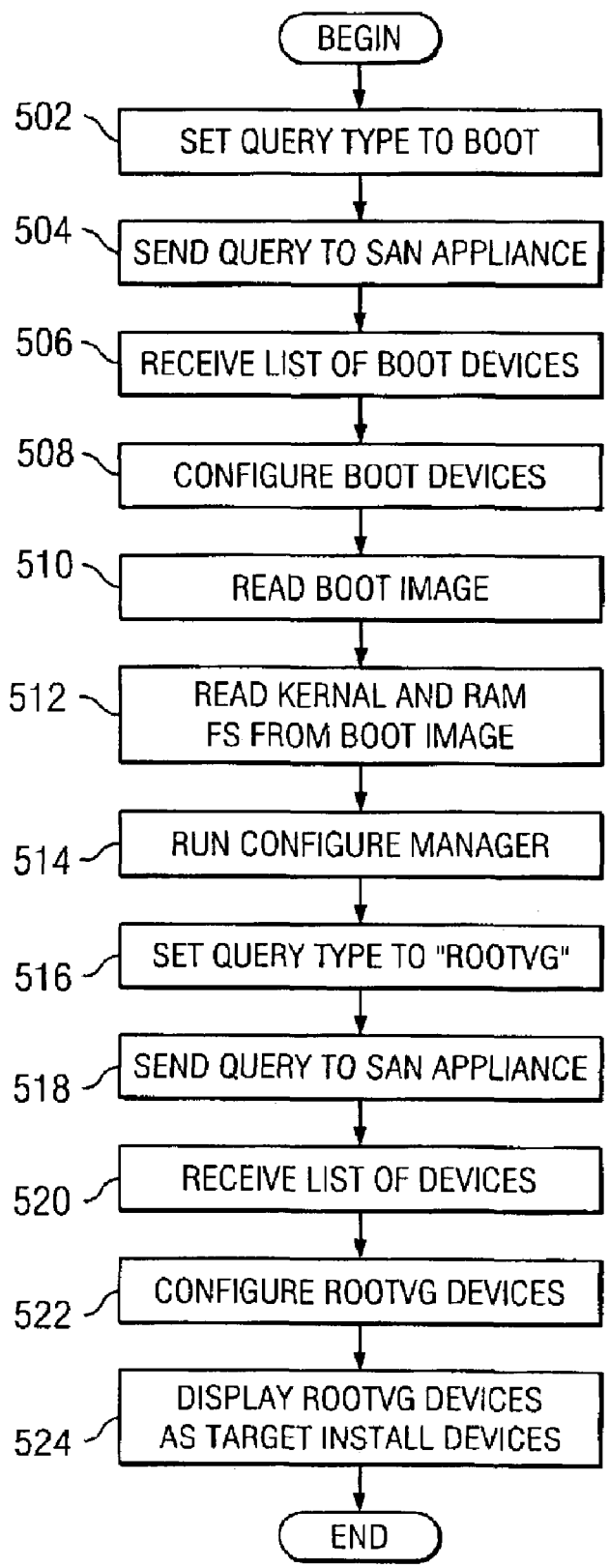
FIG. 5 is a flowchart illustrating the operation of an install/maintenance operation in accordance with a preferred embodiment of the present invention.

With reference now to FIG. 5, a flowchart illustrating the operation of an install/maintenance operation is shown in accordance with a preferred embodiment of the present invention. The process begins and the IPL firmware sets the query type to "boot" (step 502). The firmware then sends the query to the SAN appliance (step 504) and receives a list of boot devices from the SAN appliance (step 506).

Then, the process configures the boot devices (step 508), reads the boot image (step 510), and reads the kernel and random access memory (RAM) file structure (FS) from the boot image (step 512). Thereafter, the process runs a configuration manager (step 514).

The configuration manager sets the query type to "rootvg" (step 516). Then, the configuration manager sends the query to the SAN appliance (step 518) and receives a list of rootvg devices from the SAN appliance (step 520). The process configures the rootvg devices (step 522) and displays the rootvg devices as target install devices (step 524). Then, the process ends.

Figure 6:
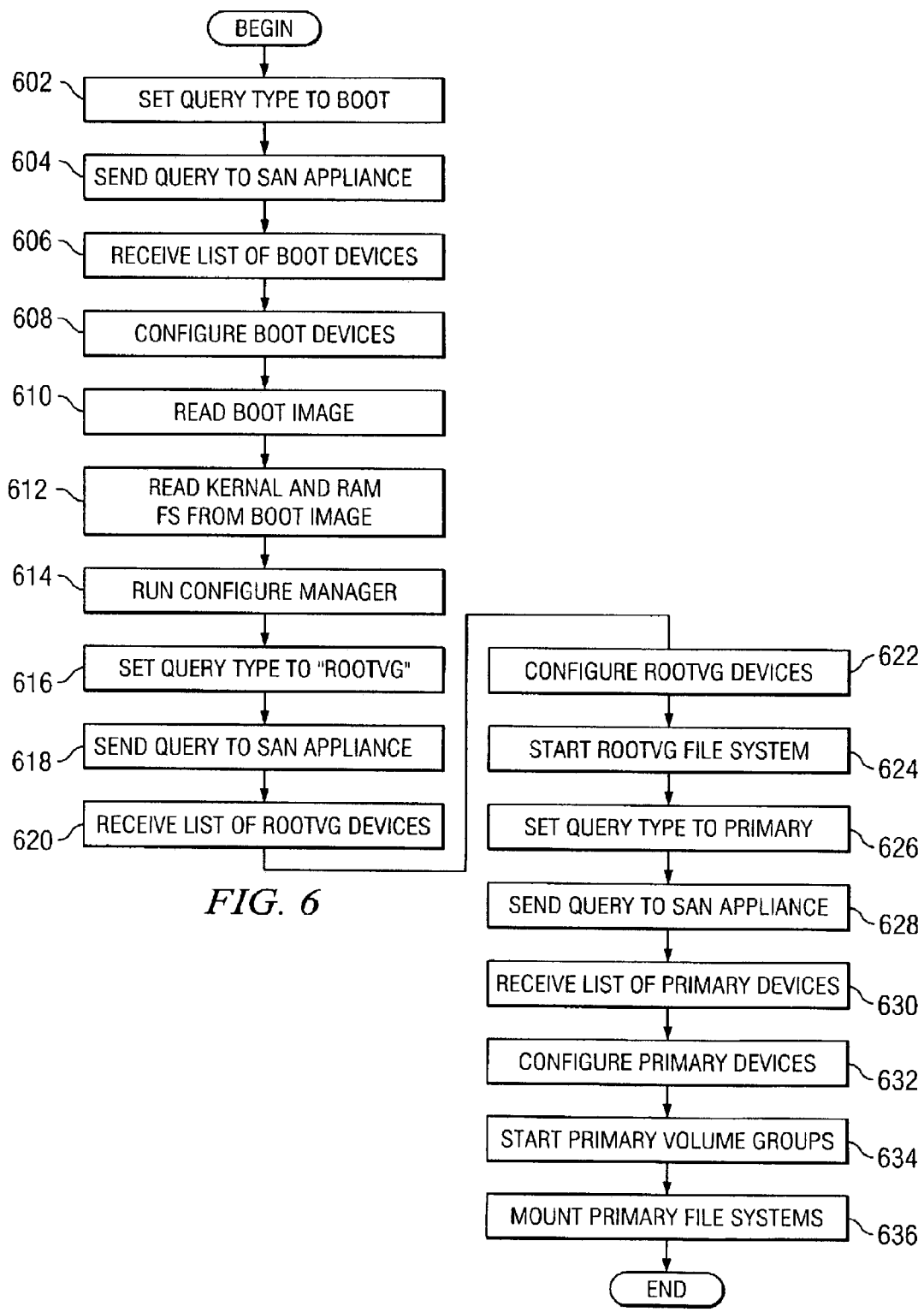
FIG. 6 is a flowchart illustrating the operation of a boot operation in accordance with a preferred embodiment of the present invention.

Turning now to FIG. 6, a flowchart illustrating the operation of a boot operation is shown in accordance with a preferred embodiment of the present invention. The process begins and the IPL firmware sets the query type to "boot" (step 602). The firmware then sends the query to the SAN appliance (step 604) and receives a list of boot devices from the SAN appliance (step 606).

Then, the process configures the boot devices (step 608), reads the boot image (step 610), and reads the kernel and RAM FS from the boot image (step 612). The process runs a configuration manager (step 614).

Thereafter, the configuration manager sets the query type to "rootvg" (step 616). Then, the configuration manager sends the query to the SAN appliance (step 618) and receives a list of rootvg devices from the SAN appliance (step 620). The process configures the rootvg devices (step 622). Then, the process starts the rootvg file system (step 624).

The configuration manager sets the query type to "primary" (step 626), sends the query to the SAN appliance (step 628), and receives a list of primary devices from the SAN appliance (step 630). Then, the configuration manager configures the primary devices (step 632) and the process starts the primary volume groups (step 634). Thereafter, the process mounts the primary file systems (step 636) and the process ends.

Once the machine is up and running, the configuration manager may then set up secondary and non-essential devices in a similar manner. The phases for boot may be divided into any number of phases, depending upon the implementation. For example, primary devices may include all other devices other than boot devices and rootvg devices.

Thus, the present invention solves the disadvantages of the prior art by providing a mechanism for dynamically configuring storage devices for a machine on a storage area network. The SAN appliance allows an administrator to assign devices from a SAN to machines for boot and/or installation. The present invention allows the boot device to be changed easily without having to change an address in the firmware of the machine itself. Furthermore, devices may be configured in phases, thus eliminating the need to configure thousands of devices only to configure them again at a later time during the boot/install process. The present invention allows for sets of devices to be defined so that a staged configuration on a given machine can dynamically determine what devices to configure during a particular configuration stage. Furthermore, these devices may be defined for a machine while the machine is down, while it is running, or before an operating system is installed for the machine.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for performing operations on a machine connected to a storage area network the method comprising:
    sending a boot device query to a storage area network appliance;
    receiving a list of boot devices from the storage area network appliance, the boot devices each having at least one boot file for use in booting another device:
    configuring at least one boot device in the list of boot devices; and
    booting the machine from the at least one boot device.

2. The method of claim 1, further comprising:
    sending a root volume group device query to the storage area network appliance;
    receiving a list of root volume group devices identifying a set of root volume group devices front the storage area network appliance; and
    configuring the set of root volume group devices.

3. The method of claim 2, wherein the storage area network appliance stores a boot type for the machine and wherein the list of root volume group devices returned by the storage area network appliance to the machine is selected based on the boot type.

4. The method of claim 3, wherein the boot type is one of normal, install, and maintenance.

5. The method of claim 2, further comprising:
    sending a primary device query to the storage area network appliance;
    receiving a list of primary devices identifying a set of primary devices from the storage area network appliance; and
    configuring the prinxaiy devices.

6. The method of claim 5, further comprising sending a secondary device query to the storage area network appliance;
    receiving a list of secondary devices identifying a set of secondary devices from the storage area network appliance; and
    configuring the set of secondary devices.

7. The method of claim 6, further comprising:
    sending a non-essential device query to the storage area network appliance;
    receiving a list of non-essential devices identifying a set of non-essential devices from the storage area network appliance; and
    configuring the set of non-essential devices.

8. The method of claim 1, wherein the storage area network appliance stores a boat type for the machine and wherein the list of boot devices returned by the storage area network appliance to the machine is selected by the storage area network appliance based on the boot type for the machine.

9. The method of claim 8, wherein the boot type is one of normal, install, and maintenance.

10. The method of claim 1, wherein the storage area network appliance receives a query from the machine, identifies a query type for the query, and returns a list of devices to the machine based on the query type.

11. The method of claim 10, wherein the query type is one of boot, root volume group, primary, secondary, and non-essential.

12. A storage area network data processing system, comprising:
    a storage area network fabric;
    a plurality of machines connected to the storage area network fabric;
    a plurality of storage devices connected to the storage area network fabric; and
    a storage area network appliance connected to the storage area network fabric, wherein the storage area network appliance receives a query from a given machine within the plurality of machines, identifies a query type for the query, and returns a list of devices to the given machine based on the query type, wherein the list of devices identifies a set of one or more devices each having at least one boot file for use in booting another device.

13. The storage area network data processing system of claim 12, wherein the storage area network appliance stores a boot type for each machine within the plurality of machines and wherein the list of devices returned by the storage area network appliance to the machine is selected by the storage area network appliance based on the boot type for the machine.

14. The storage area network data processing system of claim 13, wherein the boot type is one of normal, install, and maintenance.

15. The storage area network data processing system of claim 12, wherein the given machine receives the list of devices from the storage area network appliance and configures at least one device in the set of one or more devices.

16. The storage area network data processing system of claim 15, wherein the given machine boots from the at least one device.

17. The storage area network data processing system of claim 15, wherein the given machine performs an install operation on the at least one device.

18. The storage area network data processing system of claim 15, wherein the given machine performs a maintenance operation on the at least one device.

19. The storage area network data processing system of claim 12, wherein the query type is one of boot, root volume group, primary, secondary, and non-essential.

20. A computer program product, in a computer readable medium, for performing operations on a machine connected to a storage area network, the computer program product comprising:

instructions for sending a boot device query to a storage ares network appliance;

instructions for receiving a list of boot devices from the storage area network appliance the boot devices each having at least one boot file for use in booting another device;

instructions for configuring at least one boot device in the list of boot devices; and instructions for booting the machine from the at least one boot device.

\* \* \* \* \*